(No Model.)

C. S. SEATON.
DIE FOR HEADING BOLTS.

No. 424,136. Patented Mar. 25, 1890.

WITNESSES.
Frank Miller.
Will J Bainbridge

INVENTOR.
Charles S. Seaton
By his Attorneys
Watson + Thurston

UNITED STATES PATENT OFFICE.

CHARLES S. SEATON, OF CLEVELAND, OHIO, ASSIGNOR OF ONE-HALF TO JOHN A. SEATON, OF SAME PLACE.

DIES FOR HEADING BOLTS.

SPECIFICATION forming part of Letters Patent No. 424,136, dated March 25, 1890.

Application filed October 26, 1889. Serial No. 328,278. (No model.)

*To all whom it may concern:*

Be it known that I, CHARLES S. SEATON, of Cleveland, in the county of Cuyahoga and State of Ohio, have invented certain new and useful Improvements in Dies for Heading Bolts, of which the following is a full, clear, and exact description, reference being had to the accompanying drawings, in which—

Figure 1:
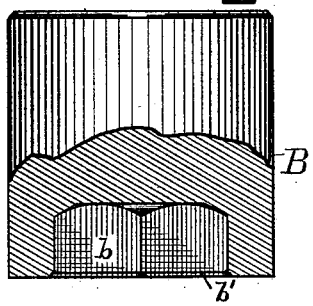
Figure 2:
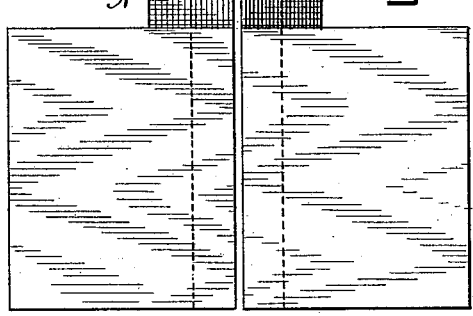
Figure 3:
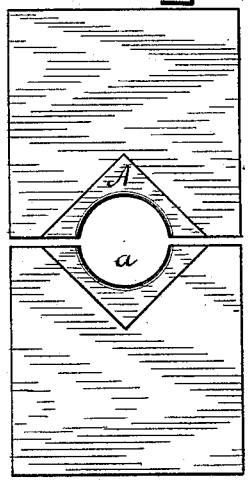
Figure 4:
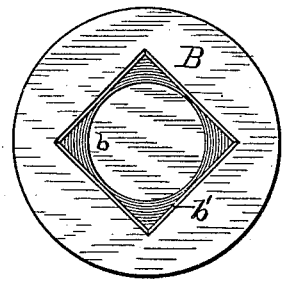

Figure 1 is a side view of the female die, shown partly in section. Fig. 2 is a side view of the male die. Fig. 3 is an end view of the latter, and Fig. 4 is an end view of the former.

The objects of my invention are to reduce the cost of heading bolts and like articles, to make the head uniformly of the desired shape, and to improve the quality and strength of the finished articles.

In all practical bolt-head machines the head is formed by upsetting the end of a heated rod and then giving to this upset end its required configuration by a series of blows or compressions successively delivered in different directions by mechanically-moved hammers or pressure-dies. With some machines it is also necessary that a skillful operator shall turn the rod to just the proper extent during the interval between the successive blows, in order that the head may be made square, hexagonal, or in any other desired shape. The successive blows or compressions delivered to the rapidly-cooling iron tend to crystallize it and destroy its fiber, and many bolts made by this process are imperfect and worthless. The employment of skilled labor also adds to the cost of the bolts, and even such workmen are unable to turn the rod in machines where this is required with such accuracy as to make the heads uniformly of the desired shape. By the use of my invention, hereinafter described, those and other objectionable features are done away with and the head is formed automatically by a single blow and uniformly in the desired form.

My invention resides in the dies employed for forming the bolt-head.

It consists in a female die having a socket of the shape and size of the head to be formed in all respects, except that it is deeper than the thickness of said head, which socket is provided with outwardly-beveled outer edges, and a male die having substantially the same cross-sectional area and configuration, and having an orifice which occupies the same position relative to the said die that the bolt-body will occupy with respect to the bolt-head.

Referring to the drawings, A represents the male die. Its shape and size in cross-section are substantially that of the bolt-head which is to be formed. An orifice $a$ passes through the die in a position relative thereto, exactly like the position which the body of the bolt is to occupy relative to its head. The head of a bolt is generally placed centrally on the body, and the orifice $a$ is therefore shown in the center of the die A. The die shown is designed to make a square head upon the bolt-body; but any form of head may be formed with properly-shaped dies.

The drawings show the die A split into two parts, but it may as well be in a single piece if the machine in which it is to be used will require it. The die is also shown formed on a block of metal and integral with it; but this is only necessary for the purpose of re-enforcing and strengthening the die and for making it more convenient to work with.

The die B is the female die, and is generally in this art called the "header." The socket $b$ is deeper than the thickness of the bolt-head it is designed to form, and the edges of said socket are beveled outwardly for the purpose hereinafter mentioned. Otherwise it is of substantially the same shape and size as said male die, and of such a shape and size that it will slide smoothly over the die A.

I am aware that a header of substantially the shape of the head to be formed has been employed to upset the ends of the metal in rivet-making machines, and also that attempts have been made to form bolt-heads in a similar manner; but these dies in all cases have crowded the metal against the flat face of a die, thereby forming almost invariably a fin of metal between the meeting-surfaces of the header and flat face of the die. This fin on a rivet is not very objectionable; but it is of great importance that it should not be present on a bolt-head. With my dies above described the bolt-head is formed by a single blow, perfect and uniform in shape, and without any fin whatever. These dies are also applicable to use in machines for making rivets and other similar articles.

I am aware of the Patent No. 83,377, granted October 27, 1868, to Robert Gracey, and I therefore do not desire that my claim shall be construed to include the dies therein shown and described. My dies differ from the Gracey dies in two important particulars which are material to the successful practical operation thereof in modern bolt-making machines, and which enable me to make bolts with them of uniform size. I refer first to the omission of the die-blocks which surround the male die in the Gracey dies, which die-blocks are stated in the patent to be (and as a matter of fact are) essential features of said dies, and, second, to the provision of the beveled outer edge of the socket of the female die.

One purpose of the die-blocks in the Gracey dies is to so guide the movable die that the male die shall accurately enter the socket in the female die; but the employment of these die-blocks, while useful for the above-named purpose, are in other respects objectionable and render said dies unfit for use in the rapidly-acting modern bolt-making machines, because all of the heat of the rod being headed is inclosed and the dies soon become hot. Were not some means provided for introducing water or some other cooling medium at each stroke of said dies, they would quickly become inoperative, and this necessary use of water would make the process of making bolts far slower than the rate at which modern bolt-making machines commonly operate and at which they must operate, in order that their product may compete in cost with the products of other machines.

I secure the accurate entrance of the male die into the socket of the female die by the beveled edges of said socket. My dies are not inclosed and are not therefore as quickly heated. If the circumstances require it they may be kept sufficiently cool by a stream of running water, which in no wise interferes with the rapidity or continuity of their action. Moreover, these beveled edges of the socket of the female die are the features of construction whereby I am able to make bolt-heads in any number of substantially the same size. When the female die begins its movement toward the male die, in which the hot rod is being held, the rod is upset and the metal spreads. If some of the metal spreads outside the socket, either because the metal at that point is softer or because the rod is bent, or for any other reason, the end of the male die will push it back up the beveled edges into the socket $b$ until the same is completely filled. If there is any excess of metal, it is sheared off as the die A enters that part of the socket above said beveled edges. The male die should move past the beveled part of the socket perhaps a thirty-second of an inch, and thus compress the inclosed metal.

With the Gracey dies any metal which spreads outside the socket is not pushed back, but is sheared off, and there is therefore no certainty that the same amount of metal will be inclosed within said socket at all times. To obtain heads of perfect form, therefore, the male die must be crowded into the socket as far as it will go, and consequently the thickness of the head will vary as the amount of metal inclosed within the socket varies.

Having thus described my invention, what I claim as new, and desire to secure by Letters Patent, is—

The herein-described dies for bolt-heading and other similar machines, which consist of a female die provided with a socket, the outer edges of which are beveled outward, said socket inside said beveled part being of the same shape and size as the bolt-head to be formed therein, except that it is slightly deeper than the thickness of said bolt, and a male die adapted to enter said socket and fit snugly therein, provided with an orifice which occupies a position relative thereto similar to the position which the bolt-body occupies relative to its head in a finished bolt.

CHARLES S. SEATON.

Witnesses:
 W. J. BAINBRIDGE,
 E. L. THURSTON.